United States Patent [19]
Cellai et al.

[11] Patent Number: 6,031,485
[45] Date of Patent: Feb. 29, 2000

[54] DIGITAL BI-STATIC SPREAD SPECTRUM RADAR

[75] Inventors: Luca Cellai; Domenico De Martino, both of Rome, Italy

[73] Assignee: Space Engineering S.p.A., Rome, Italy

[21] Appl. No.: 09/103,863

[22] Filed: Jun. 24, 1998

[30] Foreign Application Priority Data

Jun. 24, 1997 [IT] Italy ................................. RM97A0378

[51] Int. Cl.$^7$ .................................................... G01S 13/26
[52] U.S. Cl. ........................ 342/131; 342/132; 342/135; 342/192; 342/196
[58] Field of Search ................... 342/131, 132, 342/134, 135, 192, 195, 196

[56] References Cited

U.S. PATENT DOCUMENTS

| | | | |
|---|---|---|---|
| 4,605,922 | 8/1986 | Blattman | 340/552 |
| 4,771,289 | 9/1988 | Masak | 342/383 |
| 5,265,121 | 11/1993 | Stewart | 375/99 |
| 5,361,072 | 11/1994 | Barrick et al. | 342/133 |
| 5,493,306 | 2/1996 | Rudish et al. | 342/371 |
| 5,565,764 | 10/1996 | Priebe et al. | 324/76.21 |
| 5,657,021 | 8/1997 | Ehsani-Nategh et al. | 342/70 |
| 5,706,010 | 1/1998 | Franke | 342/47 |
| 5,793,798 | 8/1998 | Rudish et al. | 375/206 |
| 5,818,386 | 10/1998 | Belisle | 342/372 |
| 5,896,105 | 4/1999 | Murphy et al. | 342/368 |

FOREIGN PATENT DOCUMENTS 0681190  11/1995  European Pat. Off. .

OTHER PUBLICATIONS

Betts, "An X–Band Bistatic Radar System" European Microwave Conference, Sep. 1990, pp. 861–872.

Blattman, "Spread Spectrum Technology", Proceedings 1985 Carnahan Conference, May 1985, pp. 65–74.

Baldanzi, P. et al, "Programmable wideband signal genration and matched filtering through a full digital approach", IEEE 4th Int'l Symp. on Spread Spectrum Techniques and Application Procs., vol. 1, pp. 42–46, 1996.

Houghton, A.W. et al, "Detection of spread–spectrum signals using the time domain filtered cross spectral density", IEE Proc.–Radar, Sonar Navig., vol. 142, No. 6, pp. 286–292, Dec. 1995.

*Primary Examiner*—John B. Sotomayor
*Attorney, Agent, or Firm*—Harrison & Egbert

[57] ABSTRACT

A bi-static spread spectrum digital radar including a transmitting antenna and a receiving antenna array separate from and positioned at a distance from the transmitting antenna. The transmitting antenna transmits a pseudo random digital signal as produced by a pseudo random digital signal generator. The receiving antenna array receives signals simultaneously and parallely as reflected from a target by the transmitting antenna. A plurality of analog-to-digital converters are connected respectively to each element of the receiving antenna array so as to convert the received analog signal into a digital signal. Digital beams are produced and directed to a set of digital receivers. A processor is provided so as to produce a digital output from the set of digital receivers.

10 Claims, 8 Drawing Sheets

| Range | Pulsed Radar | | | Bi-Static Digital Radar | | |
|---|---|---|---|---|---|---|
| | PRF 1 kHz, DC 10%, PP 100 kW Echo (0.1 m^2) | | | WFM 1 s, BB 100 kHz, P 50 kW Echo (0.1 m^2) | | |
| km | Power dBm | Energy dBm's | S/N dB | Power dBm | Energy dBm's | S/N dB |
| 50 | -104.46 | -144.46 | 26.94 | -137.46 | -107.46 | 63.94 |
| 75 | -111.50 | -151.50 | 19.90 | -144.50 | -114.50 | 56.90 |
| 100 | -116.50 | -156.50 | 14.90 | -149.50 | -119.50 | 51.90 |
| 125 | -120.37 | -160.37 | 11.02 | -153.37 | -123.37 | 48.02 |
| 150 | -123.54 | -163.54 | 7.86 | -156.54 | -126.54 | 44.86 |
| 175 | -126.22 | -166.22 | 5.18 | -159.22 | -129.22 | 42.18 |
| 200 | -128.54 | -168.54 | 2.86 | -161.54 | -131.54 | 39.86 |
| 225 | -130.59 | -170.59 | 0.81 | -163.59 | -133.59 | 37.81 |
| 250 | -132.42 | -172.42 | -1.02 | -165.42 | -135.42 | 35.98 |
| 275 | -134.07 | -174.07 | -2.67 | -167.07 | -137.07 | 34.33 |
| 300 | | | | -168.58 | -138.58 | 32.82 |
| 325 | | | | -169.97 | -139.97 | 31.43 |
| 350 | | | | -171.26 | -141.26 | 30.14 |
| 375 | | | | -172.46 | -142.46 | 28.94 |
| 400 | | | | -173.58 | -143.58 | 27.82 |
| 425 | | | | -174.63 | -144.63 | 26.77 |
| 450 | | | | -175.63 | -145.63 | 25.77 |
| 475 | | | | -176.57 | -146.57 | 24.83 |
| 500 | | | | -177.46 | -147.46 | 23.94 |

FIG. 3

DIGITAL BI-STATIC SPREAD SPECTRUM RADAR

TECHNICAL FIELD

The invention concerns a radar using a transmission method with a pseudo-random signal (spread spectrum), which allows an optimal usage of the available transmission power. This radar is constituted by a transmitter and a receiver capable of being connected, respectively, to physically and functionally separate antennas, also of different types, that can be located in different places, also very far away from each other. The radar transmission method uses a continuous, pseudo-random signal, known also as spread spectrum signal or 'spread spectrum', that allows detection targets less reflective and more distant, when compared to traditional radar with the same available power and with a fixed bandwidth availability. This behavior is due to the greater energy incident on the target and to the particular type of the receiver used.

The originality of the invention is essentially based on the combination of the following elements:

(1) pseudo-random characteristics (spread spectrum) of the transmitted signal;

(2) physical and functional separation of the transmitting and receiving antennas (bi static radar);

(3) usage of an array antenna as the receiving antenna;

(4) analog to digital conversion of the signal received from each elementary antenna of the array;

(5) parallel and simultaneous forming (with a digital technique) of the receiving beams and;

(6) simultaneous multiple correlation and parallel architecture of the digital receivers connected to each output of the digital beam forming network.

As well knot, radar is an apparatus that can detect the presence of objects, normally with no cooperation, which are located at a certain distance from it (radar range), by employing the structure of the objects to reflect electromagnetic energy transmitted by the radar itself.

This energy is intercepted by the target, and a part of it is scattered in the space. The radar receiving antenna collects a part of the energy scattered by the target and sends it to the receiver, which processes it just to detect the presence of an echo and to extract position data, and possibly velocity data.

Currently, two main types of radar are employed:

(1) pulsed radar and (2) continuous wave radar.

In pulsed radar the measure of target distance is determined by the measurement of the time elapsed from the transmission of an electromagnetic energy pulse to the reception of its echo.

In continuous wave radar, a continuous wave, typically frequency modulated by a triangular signal, is transmitted. The measure of the target distance is made through the measurement of the frequency shift between the transmitted signal and the one eventually received.

Normally the radar in operation uses the same antenna both to transmit, and to receive signals. A radar that uses different antennas for transmission and reception is named, in the literature, as bi-static radar, and, to the best knowledge of the inventors.

It is also known that the radar performances generally depend on its capacity to detect the echo energy reflected by the target. To obtain this result, it is necessary, either to increase the energy incident on the target, or to increase the receiver sensitivity.

SUMMARY OF THE INVENTION

The radar, to which the presented invention refers, employs the transmission of a continuous, pseudo-random, spread spectrum signal. This signal, with the same available power and for a fixed bandwidth availability, allows detection of less reflecting and more distant objects, with respect to the two radar types previously mentioned. This effect is dependent on the increased energy incident on the target, and on the particular type of receiver used. This result is obtained without any reduction of the simultaneous and parallel analysis capacity of all radar beams and all radar range cells. The simultaneity of the receiving beams is ensured by the array antenna used and by the digital beam forming technique. The parallel analysis of all the range cells is ensured by the particular architecture of the digital receiver. An alternative method for describing the bistatic spread spectrum radar operation, in the case of the transmission of a pseudo-random DS-SS (DirectSequence-Spread Spectrum) signal, is the following: the system pushes to the limit the integration gain of consecutive pulses by removing the usual limitation of the maximum number of pulses transmitted in a beam.

With respect to the previously mentioned solutions (pulsed radar and continuous wave radar, almost always mono-static), the present radar offers also other advantages, some of which are described hereinafter.

The receiving antenna is of a passive type and therefore is virtually invisible to electromagnetic detection: that antenna, in fact, can be located far away from the transmitting one (active antenna), that is the only detectable antenna, since it radiates an electromagnetic signal.

Due to the processing gain associated with the usage in this radar of the spread spectrum transmission technique, it is possible to detect targets much smaller and more distant than before.

Furthermore, due to the pseudo-noise (spread spectrum) signal usage, the radar transmission is very difficult to detect and/or is less disturbing towards other systems (low interference). This means that the radar exhibits LPI/LI (LOW Probability of Intercept/Low interference) properties.

The transmitting antenna appears, from the transmitted signal (signature) point of view, as a generic telecommunication transmitter and allows for a better camouflage of the radar itself.

The availability of many classes of spread spectrum signals allows for a code agility, that, joined with the usual frequency agility, makes very difficult the ECM (Electronic Counter Measures) techniques.

The anti-ECM resistance characteristics are enhanced with respect to the intentional disturbances (jamming), that are reduced both by the processing gain associated with the spread spectrum signal usage, and by the possibility to reduce the receiving array antenna gain in the direction of the noise source (jammer), with the use of the "nulling lobe" classic technique, in the digital beam forming network.

By the absence of refrigerating devices and antenna rotation devices, the antenna assembly is simplified (with a further reduction of weight), and this ensures to the radar a better reliability and capability of withstanding the environmental stress, either natural or intentional.

In summary, the present radar has a very low probability of detection (LPI Low Probability of Intercept), exhibits a good resistance to jamming (AJ Anti-Jamming), shows a low ARM (Anti Radiation missiles) vulnerability due to the array passive receiving antenna and, particularly, it has better detection characteristics, with equality of available transmitted power.

The invention is located in the scientific field of radars more particularly in the military radar field, with surveillance finality and eventually as an help to the guidance of devices using passive sensors. It is applicable both in the military, and in civil applications.

The radar of the present invention is constituted of a transmitter and a receiver respectively connected to physically separated antennas, also of different types, that can be installed in different locations, also very far away from each other.

The transmitting antenna can be of various types: dipole, Yagi, reflector antenna, horn radiator antenna, array antenna, etc., depending on the radar working frequency and the desired polarization, provided that it can show coverage characteristics matching the surveillance volume. For example, if an essentially omnidirectional azimuth coverage, with an elevation angle not too high, is requested, a simple vertical dipole can be used.

The transmitter must continuously radiate in the surveillance volume, a pseudo-random signal (pseudo noise), centered on the requested carrier radio frequency, with a power adequate to the requested range of the target type of interest.

As Well Known, a pseudo-random signal, often indicated as "pseudo noise" or "spread spectrum", has autocorrelation properties, very similar to the noise, but to be nevertheless of deterministic type, that is well known a priori to the radar receiver. A "pseudo noise" type signal, which can be used, is the signal described in the literature as "direct sequence spread spectrum" (DS-SS), that is made of a sequence of digital pulses produced by a "pseudo noise" code generator.

It is useful to note that also other pseudo-random signal types ("pseudo noise" or "spread spectrum"), with autocorrelation characteristics similar to that of the noise, could be used with an equal benefit by the system.

The pseudo-random signal is converted to the interested transmission frequency, with a simple or multiple frequency conversion technique. In the event that it is interesting to periodically change the carrier radio frequency, it is possible to employ the frequency agility technique, described in the literature as "frequency hopping" (FH)

An essential advantageous characteristic of the radar transmitter is the ability to generate, with direct digital synthesis techniques, the "spread spectrum" signal in base band (BB), and is to convert it, in a second time, to the final transmission frequency, or the one to generate directly its version centered on the intermediate frequency (IF), or finally to generate its version centered directly on the carrier transmission frequency. If it is chosen the direct digital synthesis of the pseudo-random signal (spread spectrum) directly into the intermediate frequency (IF), or into the final radio frequency, the total number of the frequency conversions needed is lower.

The receiving antenna is constituted by an array of elementary receiving antennas. The elementary antennas can also be of different types, for example dipole, horn radiator, Yagi, microstrip, etc.

Each elementary antenna of the receiving array is directly connected to a frequency converter with a low noise figure (low noise figure (block) frequency (down) converter), that, in turn, feeds an analog-to-digital dedicated converter (A/D converter). The A/D conversion frequency is sufficiently high to allow both the correct conversion of the received signal, and to avoid the phenomenon known as "aliasing".

The number of bits of the A/D converter is such as to ensure the correct operation of the radar in the whole expected range of the received signal.

The digital streams coming from each element of the array (with "element" it is meant the set of elementary antenna, the "low noise" frequency converter and the A/D converter) feed the digital beam former ("digital beam forming network"). This has as many (digital) inputs as the number of elements of the array and as many (digital) outputs as the number of beams necessary to cover the space sector of interest.

For example, if we needed 250 beams and the array had 100 elements, the digital beam former ("digital beam forming network") would have 100 (digital) inputs and 250 (digital) outputs. The input and output digital data streams of the "digital beam forming network" are obviously parallel and simultaneous. For each beam of interest in the receiver coverage, the "digital beam forming network" performs the task to compute, with suitable complex (i.e. with real and imaginary parts) coefficients, the linear combination of the digital inputs which best synthesizes the beam of interest. With the term "suitable" it is meant the fact that the coefficients are such as to synthesize the beam of interest according to the normal rules of the array antennas technology.

The suitable coefficients, for each beam, are computed with respect to the usage conditions. In fact, if it is desired to minimize the effects of an eventual interference signal, the well known adaptive suppression technique ("adaptive suppression of interference signal"), known also as "array (adaptive) nulling technique", could be used for array antennas.

Each digital output of the "digital beam forming network", that is the digital signal associated to each beam of the receiving antenna, feeds a dedicated digital receiver.

Each digital receiver has, in turn, the task to operate, in parallel and simultaneously, the digital correlation of the echo signal received, with local replicas, with suitable delay, of the pseudo random ("spread spectrum") transmitted signal. Each delayed replica of the transmitted signal can detect the echo signal coming from each elementary distance cell ("range cell") in which each receiving beam can be divided.

The synchronization between transmitter and receiver, needed to facilitate the received signal demodulation and the process of digital correlation, is supplied by an auxiliary channel (cable, optical fiber, radio channel).

The receiver, in fact, must have available:

(1) the transmitted carrier frequency information;
(2) the information related to the initial time (epoch) of the transmission of the base pseudo random "spread spectrum" signal;
(3) the identifier of the particular pseudo random transmitted signal and, in the case, the particular carrier frequency used with "frequency hopping";
(4) the relative position of transmitter and receiver and, preferably,
(5) the (optional) information relative to the clock used in the transmitted signal synthesis.

The presented radar is capable of transmitting a continuous pseudo random (spread spectrum) signal and, with the same available power and for a certain band availability, allows, as just said before, to detect objects less reflective and more distant, with respect to the two types of radar previously cited, due to the greater energy incident on the target and to the type of receiver used (see FIG. 5).

BRIEF DESCRIPTION OF THE DRAWINGS

The invention is described now with reference to the version actually preferred by the inventors, and based on the attached drawings FIG. 1—Action scenery of the bi-static digital radar.

FIG. 3 Comparison table between a pulsed radar and the digital bi-static radar, object of the present patent pending.

DETAILED DESCRIPTION OF THE INVENTION

Figure 1:
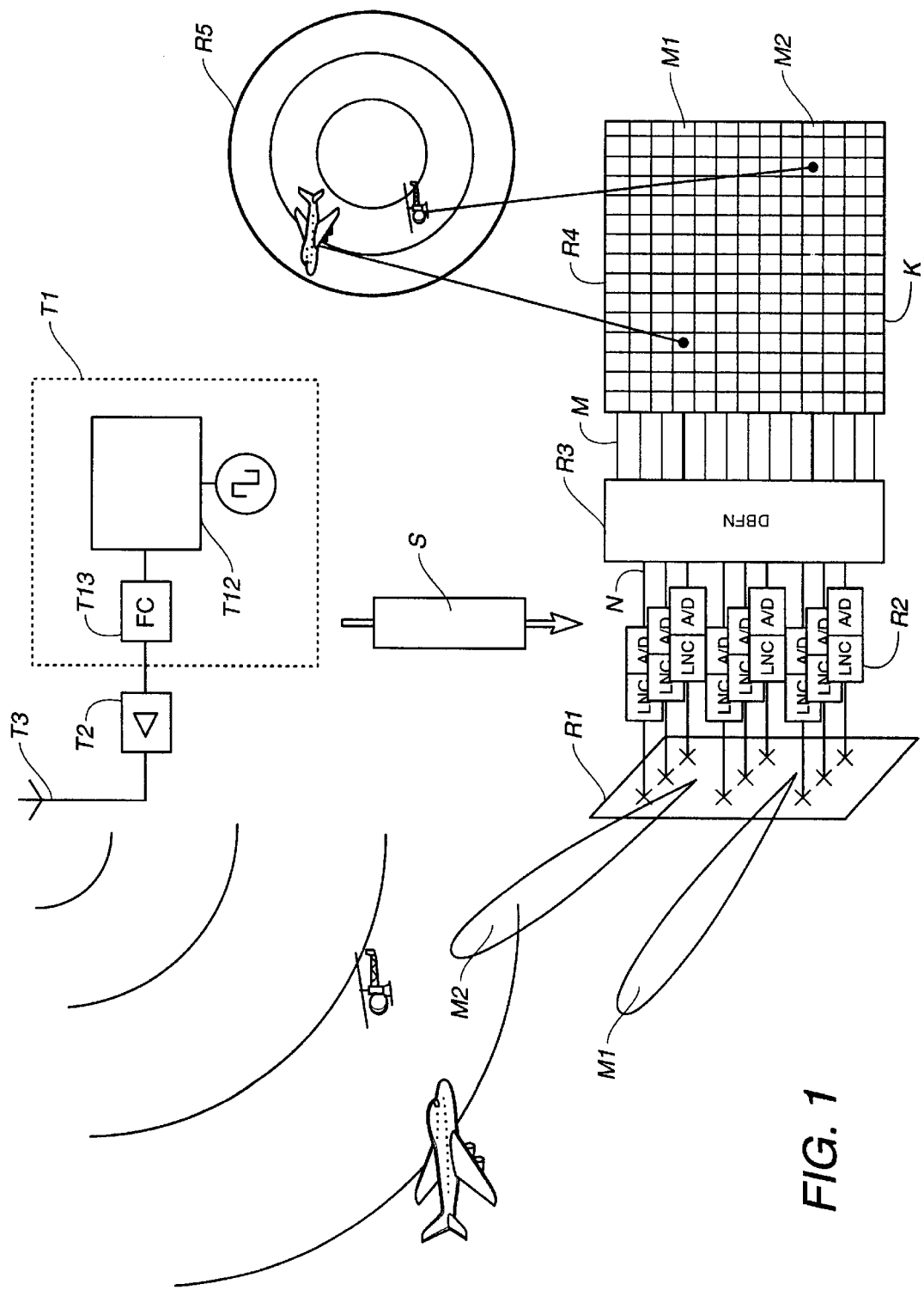

With reference to FIG. 1, T1 is the digital generation block of the pseudo random signal. The block is constituted by the digital clock generator T11, the pseudo random digital signal synthesizer T12, and the frequency converter FC-T13.

The frequency converter FC is absent if the pseudo random signal is digitally generated directly at the desired carrier frequency.

T2 indicates the linear power amplifier.

T3 indicates the transmitting antenna.

R1 indicates the receiving array antenna.

R2 is the set of low noise figure frequency converters (LNC) and the Analog-to Digital converters (A/D).

Each LNC-A/D unit is connected to the corresponding elementary antenna of the array. The number of the elementary antennas of the array is indicated with N and represents also the number of digital inputs simultaneous and parallel to R3.

R3 indicates the digital beam forming network of the parallel and simultaneous receiving beams. The number of such beams is indicated by M.

R4 indicates the set of correlation digital receivers associated to the cells. More precisely, R4 is the schematization of the radar echo detecting unit, where the rows are the single beams, and the columns are the cells c in range. When an echo is detected by the correlation digital receiver associated to the c cell, the digital signal can be represented to the operator, or submitted to further computations, proper of the target classification, discrimination, identification and clutter suppression techniques.

For each output of R3, corresponding to a receiving beam, there are as many digital correlators K as the range cells of interest. In the schematic diagram it can be noted that the presence of targets in the beams M1 and M2 produces a correlation peak in correspondence of the range cells marked with a little black dot (•).

R5 indicates the digital presentation device of the processed radar signal, or another system to which the digital information provided by the radar is to be sent. In the schematic diagram we have indicated, to be simple, a display device of PPI type.

S indicates the auxiliary synchronization channel. This channel carries the information relative to the frequency currently in use, to make a correct low noise figure frequency conversion of R2, and also the information relative to the initial time of generation of the transmitted base pseudo random signal and in the case the digital clock (optional).

Figure 2A:
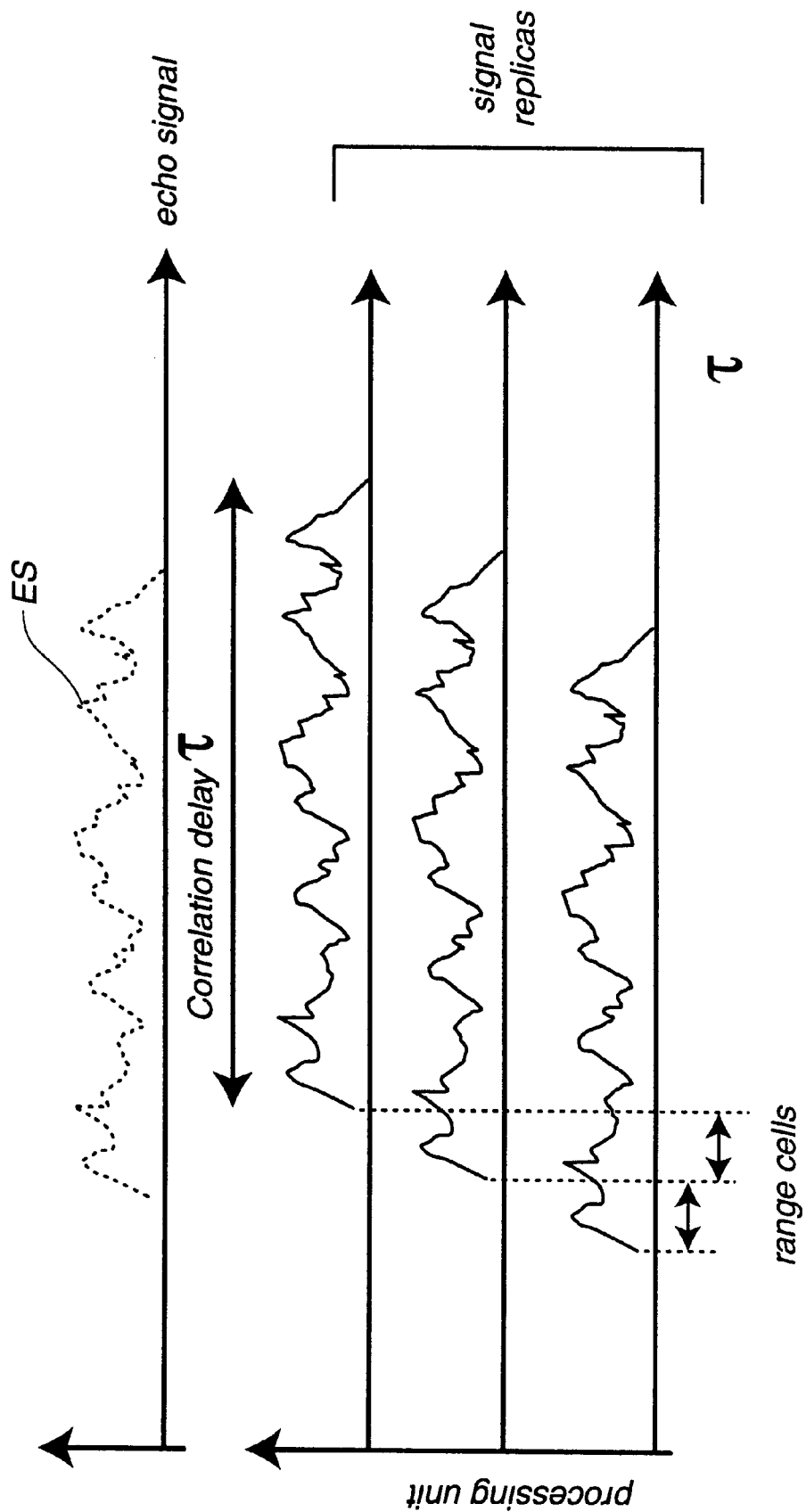
FIGS. 2a and 2b—operation principle of the correlation digital receivers connected to a generic receiving beam.

With reference to FIG. 2a, it is shown the detecting principle (with correlation) of the received pseudo random signal, containing the information of the target presence.

Figure 2B:
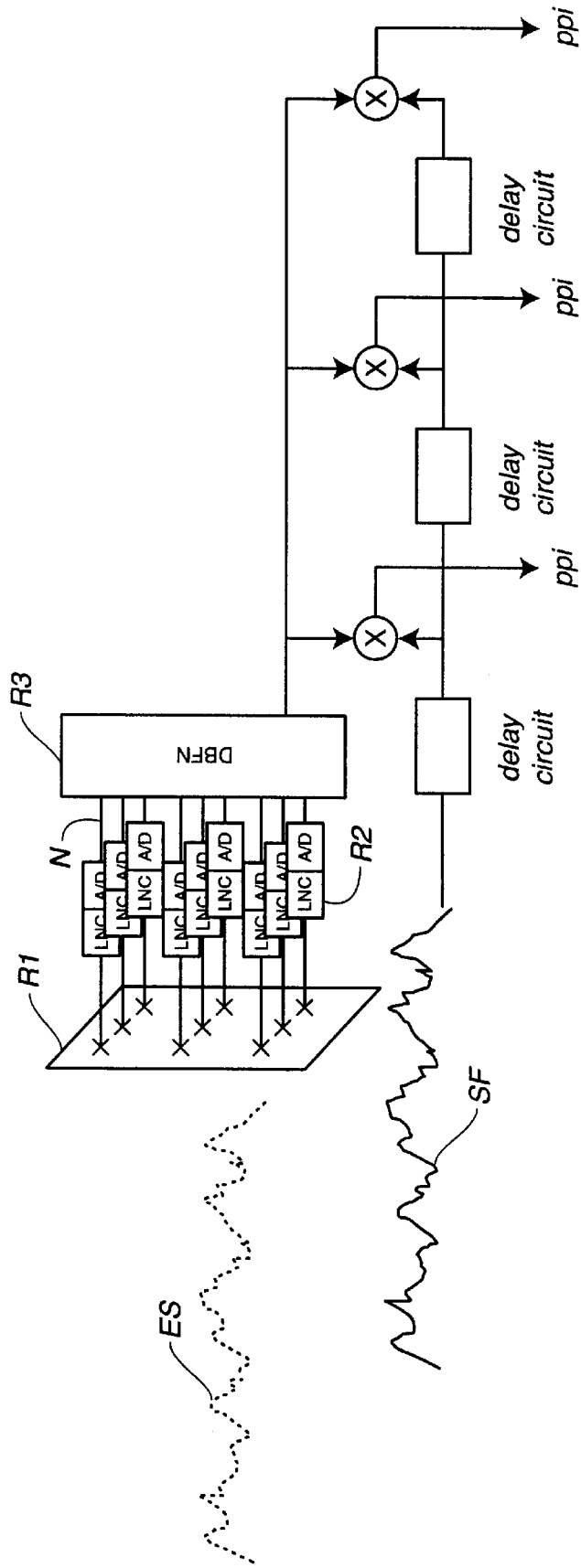

In FIG. 2b), the ES echo signal, coming from a generic beam, is received by the array antenna R1, processed as described in FIG. 1, until the output of the signal from the digital beam forming network. The digital signal received is then correlated with copies of the reference signal SF, suitably delayed on the base of range cell that will be observed. When the echo signal eventually received is aligned with the delayed copy of the reference signal SF, corresponding to the range cell observed, the correlation peak detecting the target is obtained.

Figure 6:
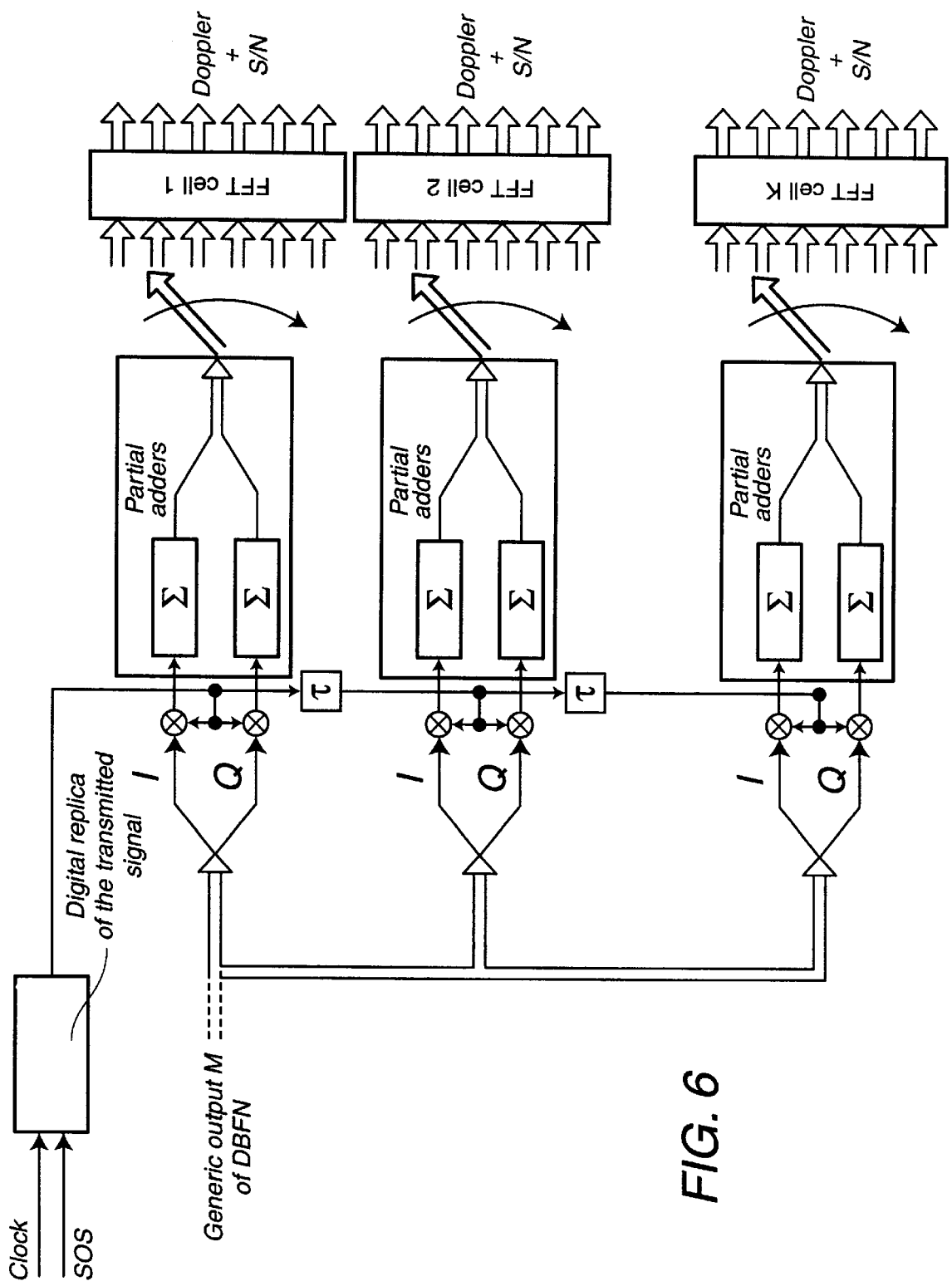
FIG. 6—Schematic representation of the correlation processor R4) for the detection of the target presence into the cell-Pure correlation architecture.

The two processors described are used for the same finality of target detection, with the difference that the first described (FIG. 6) allows the detection of the target at the end of signal reception, while the second (FIG. 7) allows the partial detection of the target during the reception of the pseudo random sequence. These processors represent one of the interesting aspects of the present present invention.

With reference to FIG. 2e), it is shown there the echo of return signal after the digital beam forming network and the replicas SF of the reference signal which are time delayed of a quantity corresponding to the c cell distance.

Figure 4:
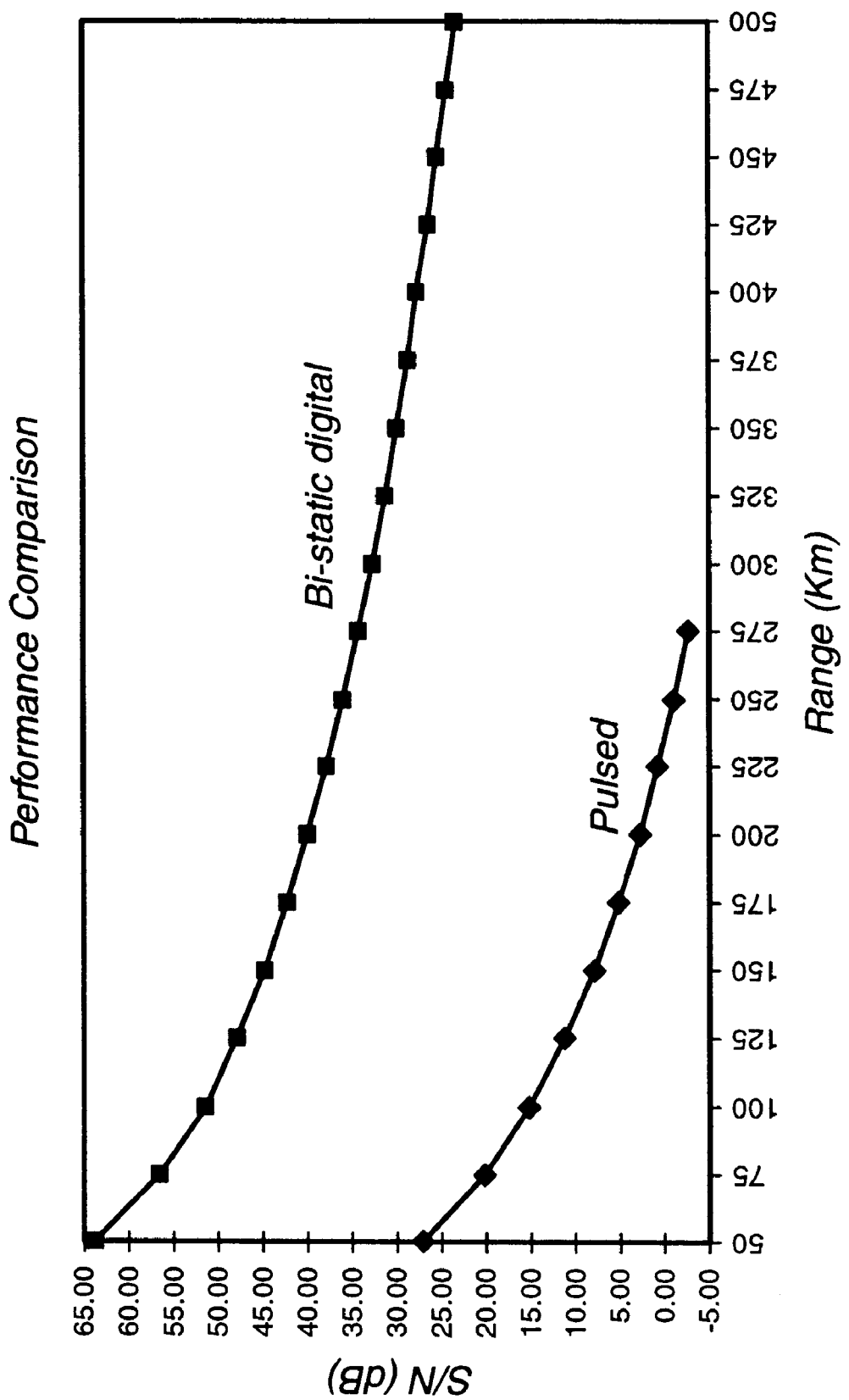
FIG. 4—Feature comparison between pulsed radar and digital bi-static radar.
Figures 5A, 5B, 5C:
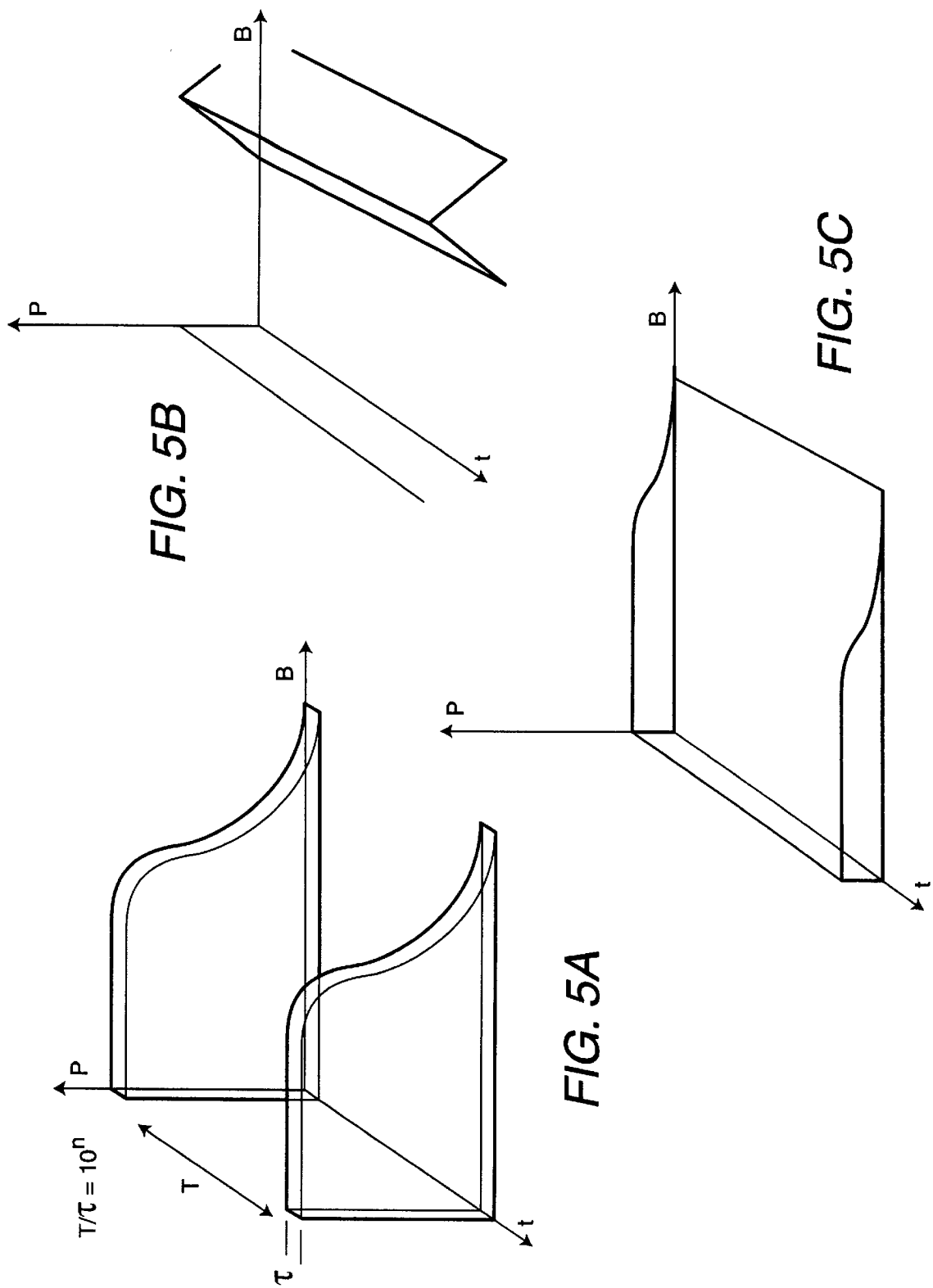
FIG. 5—Schematic representation, in the signal space, of the pulsed radar a); the continuous wave radar b); and digital spread spectrum radar c); in said figure: t=time; T=pulse repetition interval; τ=pulse duration; B=bandwidth and P=power.

With reference to the FIGS. 3 and 4, it is shown the comparison between the performance of a pulsed radar and that of the bi-static spread spectrum digital radar, in term of signal to noise ratio, and therefore of target "detecting capability". It can be noted the advantage, in the specific case, of about 40 dB, due to the "processing gain", or, more simply, to the integration of the greater energy incident on the target. As already stated, the correlation digital receiver can be implemented in two different configurations, showed in FIG. 6 and FIG. 7. in the case of FIG. 6, the correlation digital receivers (R4) operate on a digital correlation simplified architecture basis, which can be better realized with a processor of DSP (Digital Signal Processor) type, to which are assigned the functions of sub-correlation of the received signal (I and Q components) with time-delayed replicas of the time τ of the transmitted signal, their partial integration Σ and its successive processing by the FFT. These DSP are commercially available. It must be noted that the sub-correlation and the successive processing by the FFT allow on one hand to avoid the "destructive" phase lag on the correlation gain introduced by the Doppler effect associated to the radial velocity of the target, obtaining on the other hand as an additive result, the detecting and the estimate of the Doppler itself.

Figure 7:
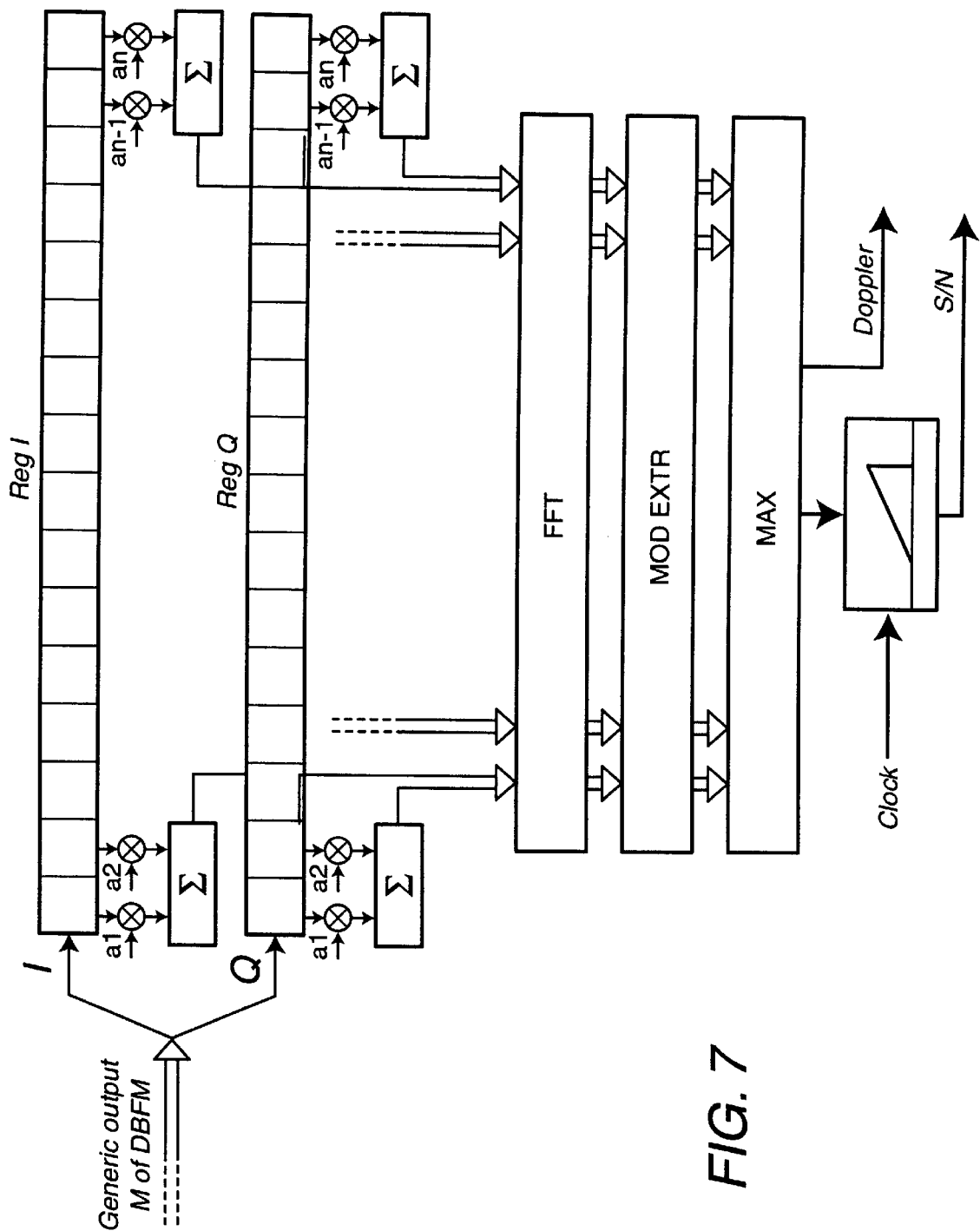
FIG. 7—Schematic representation of the processor (R4) for the detection of the target presence into the cell-FIR filter (FIR matched filter) architecture.

In the case of FIG. 7, the correlation digital receivers (R4) are realized using one or more dedicated devices (ASIC, FPGA, etc.), made of process elements composed by two registers for the I and Q components of the received signal (Reg. I and Reg. Q), by the elementary correlators of the reference signal (a1, a2, . . . aN), by the partial adders Σ, by the FFT with N inputs and N outputs, by the module extractor (MODEXTR) with N inputs and N outputs, by the maximum detector (MAX), and by a further sawtooth correlator. The foregoing disclosure and description of the invention is illustrative and explanatory thereof. Various changes in the details of the illustrated apparatus may be made within the scope of the appended claims without departing from the true spirit of the invention. The present invention should only be limited by the following claims and their legal equivalents.

We claim:

1. A bi-static spread spectrum digital radar comprising:

a transmitting antenna means;

a receiving array antenna means separate from said transmitting antenna means and positioned at a distance from said transmitting antenna means, said transmitting antenna means for transmitting a pseudo random digital signal;

a pseudo random digital signal generator connected to said transmitting antenna means;

a digital clock generator connected to said pseudo random signal generator;

a frequency converter electrically connected between said pseudo random signal generator and said transmitting antenna means;

a power amplifier means electrically connected between said frequency converter and said transmitting antenna means, said power amplifier means for amplifying a signal passed by said pseudo random signal generator to said transmitting antenna means, said receiving array antenna means for receiving signals simultaneously and parallelly as reflected from a target by said transmitting antenna means;

a plurality of low noise frequency converters connected electrically to said receiving array antenna means;

a plurality of analog-to-digital converters connected to said receiving array antenna means and adapted to convert an analog signal from said receiving array antenna means into a digital signal;

a digital beam forming means connected to said plurality of analog-to-digital converters, said digital beam forming means for producing a digital signal correlative of a signal received by said receiving array antenna means;

a set of digital receivers positioned so as to receive a digital beam from said digital beam forming means, said set of digital receivers being integrated into at least one digital processor which is adapted to produce a digital output signal; and a display means connected to said at least one digital processor, said display means for showing the digital output signal in a humanly perceivable manner or for storing the digital output signal.

2. The radar of claim 1, said pseudo random signal generator being a digital generator adapted to produce pseudo random codes of variable length.

3. The radar of claim 1, said digital clock generator having a frequency reference selected from the group consisting of quartz, rubidium, cesium and global positioning system signals.

4. The radar of claim 1, said power amplifier means comprising a low distortion linear power amplifier.

5. The radar of claim 1, said transmitting antenna means comprising an antenna selected from the group consisting of a dipole antenna and a Yagi antenna.

6. The radar of claim 1, said receiving array antenna means comprising a plurality of antennas selected from the group consisting of dipole antenna and horn radiators.

7. The radar according to claim 1, said plurality of analog-to-digital converters each having a dynamic range and instantaneous bandwidth suitable for converting the analog signals from said receiving array antenna means over an entire expected range.

8. The radar of claim 1, said digital beam forming means being a variable coefficient linear network having a number of inputs equal to a number of elements of said receiving array antenna means, said network haivng a number of outputs equal to a number of beams formed.

9. The radar of claim 1, each digital receiver of said set of digital receivers being a digital signal processor adapted to sub-correlate the digital signal with delayed replicas of the digital signal by a time factor associated with the transmitted pseudo random digital signal.

10. The radar of claim 1, said at least one digital processor comprising two registers for I and Q components respectively of the received digital beam.

* * * * *